(12) United States Patent
Kawaguchi et al.

(10) Patent No.: US 8,483,930 B2
(45) Date of Patent: Jul. 9, 2013

(54) ROBOT AND TASK EXECUTION SYSTEM

(75) Inventors: Yuichiro Kawaguchi, Wako (JP); Taro Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 659 days.

(21) Appl. No.: 12/674,021

(22) PCT Filed: Oct. 7, 2008

(86) PCT No.: PCT/JP2008/002826
§ 371 (c)(1),
(2), (4) Date: Feb. 18, 2010

(87) PCT Pub. No.: WO2009/072229
PCT Pub. Date: Jun. 11, 2009

(65) Prior Publication Data
US 2011/0106310 A1    May 5, 2011

(30) Foreign Application Priority Data
Dec. 4, 2007    (JP) ................................. 2007-313056

(51) Int. Cl.
*G06F 19/00*    (2006.01)
*H04W 48/00*    (2009.01)

(52) U.S. Cl.
USPC ............. 701/100; 700/245; 700/214; 901/17; 706/14

(58) Field of Classification Search
USPC ........ 700/245, 214; 901/17; 706/14; 701/100
See application file for complete search history.

(56) References Cited

U.S. PATENT DOCUMENTS

| | | | |
|---|---|---|---|
| 2004/0006566 A1* | 1/2004 | Taylor et al. | 707/100 |
| 2007/0112700 A1* | 5/2007 | Den Haan et al. | 706/14 |
| 2007/0192910 A1* | 8/2007 | Vu et al. | 901/17 |
| 2007/0199108 A1* | 8/2007 | Angle et al. | 901/17 |
| 2008/0051930 A1* | 2/2008 | Oh et al. | 700/214 |

FOREIGN PATENT DOCUMENTS

| | | |
|---|---|---|
| JP | 05-158533 | 6/1993 |
| JP | 2005-221333 | 8/2005 |
| JP | 2006-192562 | 7/2006 |
| JP | 2006-231421 | 9/2006 |
| JP | 2007-187632 | 7/2007 |

OTHER PUBLICATIONS

Steven Gustafson, et al., "Issues in the Scaling of Multi-robot Systems for General Problem Solving", Published online Apr. 22, 2006 Copyright Springer Science + Business Media, LLC 2006.

* cited by examiner

*Primary Examiner* — Ronnie Mancho
(74) *Attorney, Agent, or Firm* — Rankin, Hill & Clark LLP

(57) ABSTRACT

A robot and so forth capable of avoiding the mutual interference of a plurality of active sensors mounted on the other robots so that a task may be smoothly executed by each of a plurality of robots are provided. If an active sensor mounted on each of the plurality of robots (R) may mutually interfere with each other and if the degree of contribution of the active sensor to a task being executed by the self robot (R) is lower than that of the active sensor of the other robot (R) to the task being executed by the other robot (R), the sensitivity of the active sensor of the self robot (R) is decreased. As a result thereof, the mutual interference of the active sensors can be avoided, and the robot (R) can be prevented from causing trouble to the task.

8 Claims, 9 Drawing Sheets

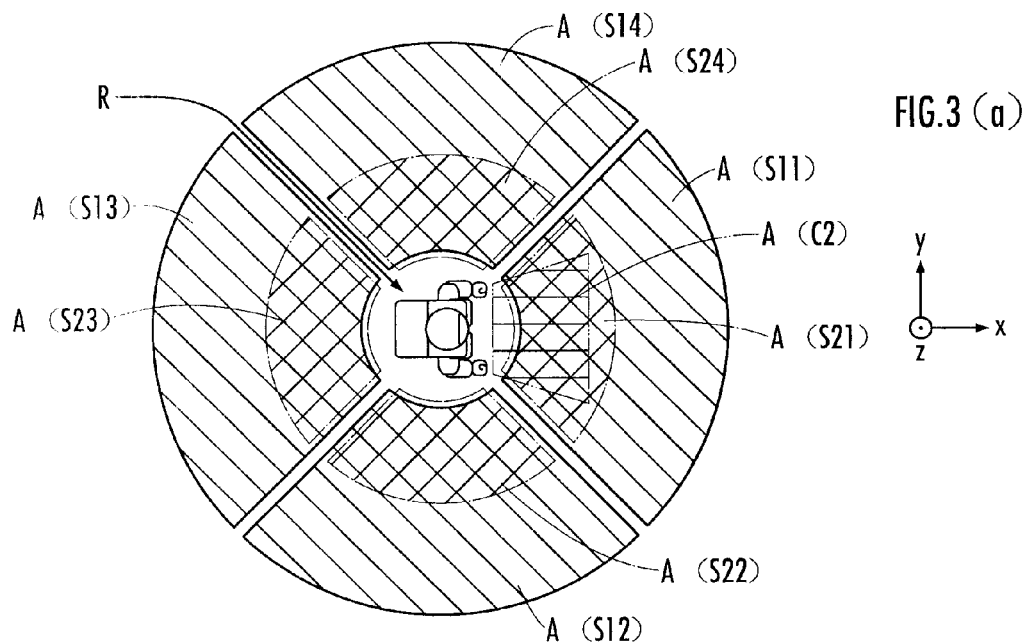
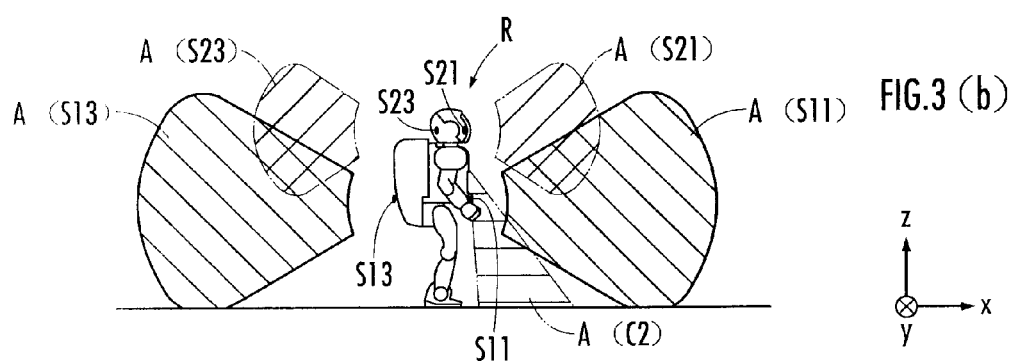
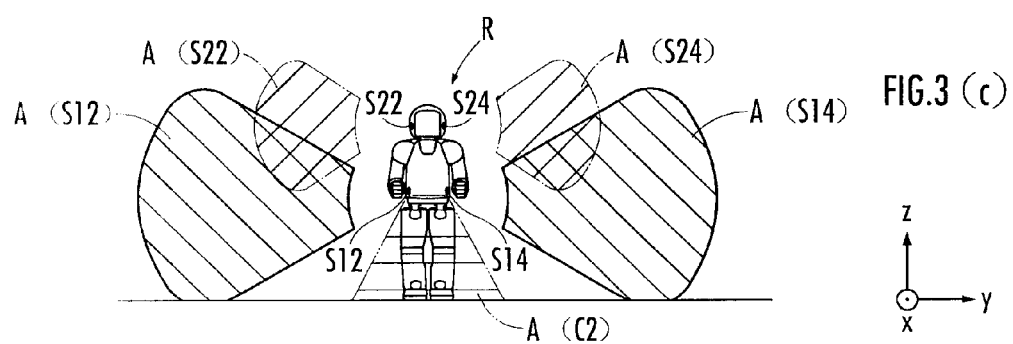
FIG.3 (a)
FIG.3 (b)
FIG.3 (c)

FIG.6

DEGREES OF CONTRIBUTION OF EACH ACTIVE SENSOR WITH RESPECT TO EACH TASK

| TASK | ACTIVE SENSOR | | | | | | | | |
|---|---|---|---|---|---|---|---|---|---|
| | $S_{11}$ | $S_{12}$ | $S_{13}$ | $S_{14}$ | $S_{21}$ | $S_{22}$ | $S_{23}$ | $S_{24}$ | $C_2$ |
| tsk1 | $\alpha_{11}$ | $\alpha_{12}$ | $\alpha_{13}$ | $\alpha_{14}$ | $\alpha_{15}$ | $\alpha_{16}$ | $\alpha_{17}$ | $\alpha_{18}$ | $\alpha_{19}$ |
| ...... | .. | .. | .. | .. | .. | .. | .. | .. | .. |
| tski | $\alpha_{i1}$ | $\alpha_{i2}$ | $\alpha_{i3}$ | $\alpha_{i4}$ | $\alpha_{i5}$ | $\alpha_{i6}$ | $\alpha_{i7}$ | $\alpha_{i8}$ | $\alpha_{i9}$ |
| ...... | .. | .. | .. | .. | .. | .. | .. | .. | .. |
| tskm | $\alpha_{m1}$ | $\alpha_{m2}$ | $\alpha_{m3}$ | $\alpha_{m4}$ | $\alpha_{m5}$ | $\alpha_{m6}$ | $\alpha_{m7}$ | $\alpha_{m8}$ | $\alpha_{m9}$ |

FIG.7

DEGREES OF CONTRIBUTION OF EACH ACTIVE SENSOR DISPOSED IN EACH OF A PLURALITY OF ROBOTS WITH RESPECT TO EACH TASK

| ROBOT | ACTIVE SENSOR | | | | | | | | |
|---|---|---|---|---|---|---|---|---|---|
| | $S_{11}$ | $S_{12}$ | $S_{13}$ | $S_{14}$ | $S_{21}$ | $S_{22}$ | $S_{23}$ | $S_{24}$ | $C_2$ |
| $R_1$ | $\beta_{11}$ | $\beta_{12}$ | $\beta_{13}$ | $\beta_{14}$ | $\beta_{15}$ | $\beta_{16}$ | $\beta_{17}$ | $\beta_{18}$ | $\beta_{19}$ |
| ...... | .. | .. | .. | .. | .. | .. | .. | .. | .. |
| $R_k$ | $\beta_{k1}$ | $\beta_{k2}$ | $\beta_{k3}$ | $\beta_{k4}$ | $\beta_{k5}$ | $\beta_{k6}$ | $\beta_{k7}$ | $\beta_{k8}$ | $\beta_{k9}$ |
| ...... | .. | .. | .. | .. | .. | .. | .. | .. | .. |
| $R_n$ | $\beta_{n1}$ | $\beta_{n2}$ | $\beta_{n3}$ | $\beta_{n4}$ | $\beta_{n5}$ | $\beta_{n6}$ | $\beta_{n7}$ | $\beta_{n8}$ | $\beta_{n9}$ |

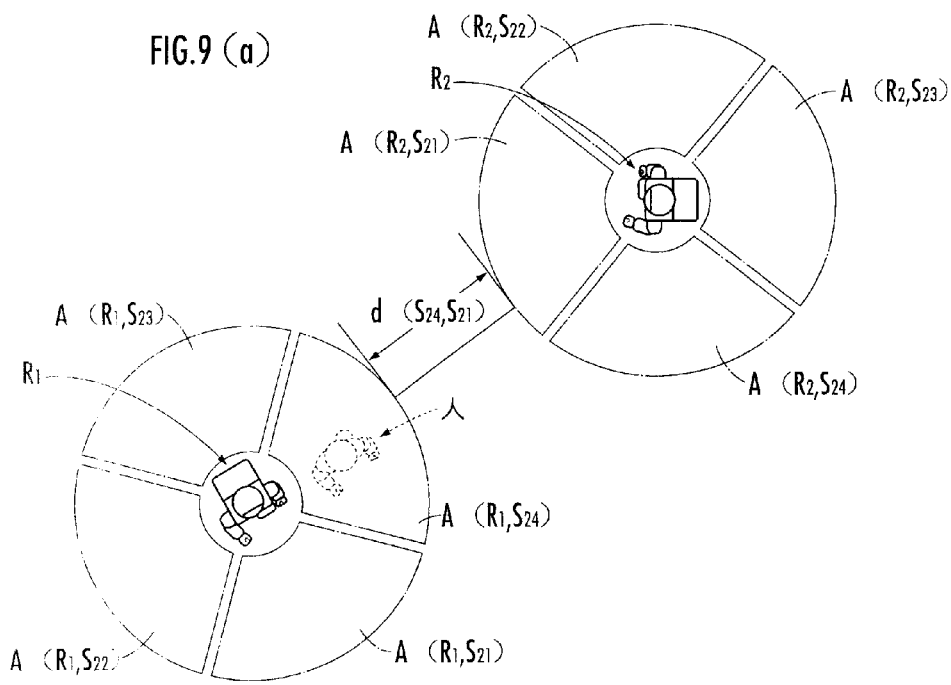
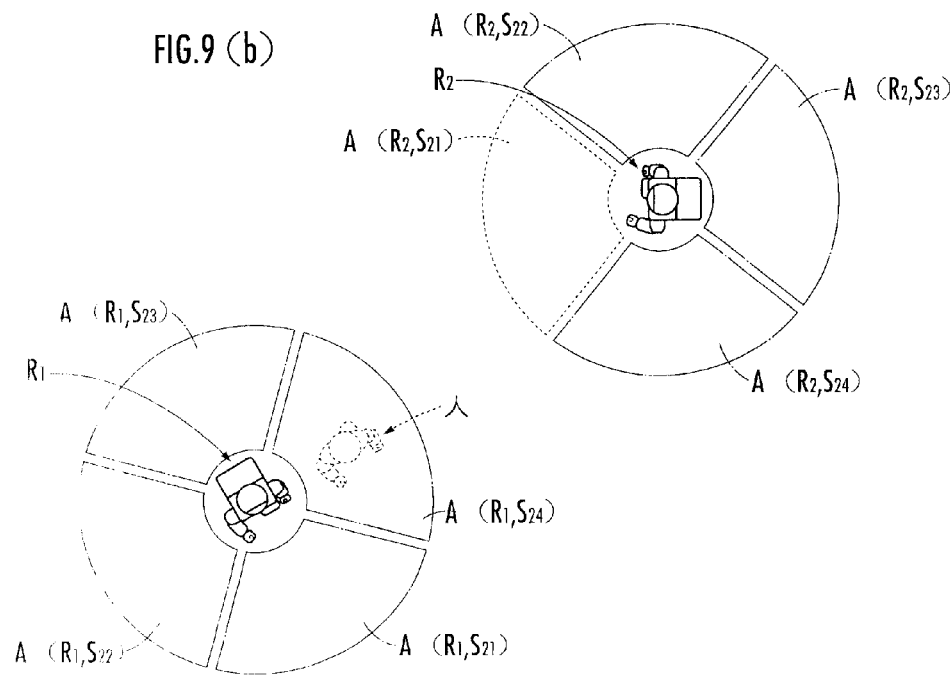

ROBOT AND TASK EXECUTION SYSTEM

PRIORITY CLAIM

The present application is based on and claims the priority benefit of Japanese Patent Application 2007-313056 filed on Dec. 4, 2007, the contents of which are incorporated herein by reference in its entirety.

BACKGROUND OF THE INVENTION

1. Field of the Invention

The present invention relates to a robot or the like executing a task by making autonomous actions.

2. Description of the Related Art

Trials have been made on a robot by applying various functions such as environment-recognizing function or autonomous moving function to the robot so as to make it execute tasks such as transporting luggage, locomotive road-guiding and the like. It has been expected to avoid a robot from contacting an object so as to execute a task smoothly by mounting thereon an active sensor which outputs electromagnetic waves, supersonic waves or the like for recognizing an external state such as a position or the like of the object and recognizes the external state according to the received reflection waves (refer to Japanese Patent Laid-open No. 2006-192562). However, in an environment where a plurality of robots mounted with active sensors, it is necessary to avoid the mutual interference between the active sensors. In this regard, there has been disclosed a technical approach which decreases an output intensity of an active sensor disposed in a robot with a low priority order determined according to a priority level or the like of a task when an interval between two robots becomes narrower or the like (refer to Japanese Patent Laid-open No. 2006-231421).

When plural active sensors are mounted on each robot, the degree of contribution of each active sensor varies in relation to contents of a task or the external state of the robot. Therefore, if the output intensities of all the active sensors are adjusted simply according to the respective priority order of each robot, it is possible that each robot may stop executing the task in vain.

SUMMARY OF THE INVENTION

The present invention has been accomplished in view of the aforementioned problems, and it is therefore an object of the present invention to provide a robot or the like capable of avoiding the mutual interference between a plurality of active sensors mounted on the other robots so that a task can be smoothly executed by each of a plurality of robots.

A first aspect of the present invention provides a robot which executes a task by making autonomous actions on the basis of communication with a support server provided with a task database. The robot of the first aspect comprises: a plurality of active sensors with directivity configured to output electromagnetic waves or elastic oscillation waves, and output signals related to an external state of the robot according to the received reflection waves of the electromagnetic waves or the elastic oscillation waves; and a controller configured to control actions of a self robot on the basis of the output signals from the plurality of active sensors; wherein the controller is provided with a first processing element and a second processing element, The first processing element is configured to determine a position and an orientation of the self robot, store the position and the orientation in the task database on the basis of communication with the support server, recognize a position and an orientation of another robot in the task database on the basis of communication with support server, and designate in the plurality of active sensors disposed in the self robot an active sensor which has a possibility to interfere with either of the plurality of active sensors disposed in the other robot on the basis of the determination result and the recognition result, and the second processing element is configured to evaluate a degree of contribution of each of the plurality of active sensors to a task being executed by the self robot, store the degree of contribution in the task database on the basis of communication with the support server, recognize at least the degree of contribution of an active sensor of the other robot designated by the first processing element in the task database on the basis of communication with the support server, compare the degree of contribution of the designated active sensor of the self robot with the degree of contribution of the designated active sensor of the other robot on the basis of the determination result and the recognition result, and decrease an output intensity of the designated active sensor of the self robot on a condition that the degree of contribution of the designated active sensor of the self robot is lower than the degree of contribution of the designated active sensor of the other robot.

According to the robot of the first aspect of the present invention, when there is a possibility that either of the plurality of active sensors mounted on the self robot interferes with either of the plurality of active sensors mounted on the other robot, the output intensity of each active sensor is adjusted according to the degree of contribution of each active sensor to the task being executed by each robot. In other words, on a condition that there is a possibility that either of the active sensors mounted on the plurality of robots, respectively, may interfere with each other and the degree of contribution of the active sensor to the task being executed by the self robot is lower than the degree of contribution of the active sensor to the task being executed by the other robot, the output intensity of the active sensor mounted on the self robot is decreased. The lowering frequency on the output intensity of an active sensor with a higher degree of contribution to a task is adjusted relatively lower; on the contrary, the lowering frequency on the output intensity of an active sensor with a lower degree of contribution to the task is adjusted relatively higher. Accordingly, the plurality of active sensors mounted on each robot can be prevented from interfering with each other so that each robot can execute the task smoothly.

A second aspect of the present invention is dependent on the first aspect of the present invention. The robot of the second aspect of the present invention is provided with a plurality of first active sensors directed to a plurality of directions for determining a position or an orientation of an object or for identifying the object as the active sensors, and the second processing element evaluates higher the degree of contribution to a task by a first active sensor which contributes to determining the position or the orientation of the object or identifying the object in the plurality of the first active sensors if the task is recognized being executed by the self robot on the basis of a determination result of the position or the orientation of the object or an identification result of the object.

According to the robot of the second aspect of the present invention, when the self robot is executing a task according to a determination result of the position or the orientation of an object or an identification result of the object by using a part of the plurality of first active sensors, the degrees of contribution of the part of the first active sensors are evaluated relatively higher. Further, when a first active sensor with a higher degree of contribution mounted on the self robot possibly interferes with another first active sensor mounted on another robot, the lowering frequency on the output intensity of the first active sensor mounted on the self robot is adjusted lower. Accordingly, the robot can continue to execute the task according to the determination result of the position or the orientation of an object or the identification result of the object which is obtained on the basis of the output result from the first active sensor with a higher degree of contribution. On the other hand, the degrees of contribution of the other first active sensors are evaluated relatively lower. Thus, when a first active sensor with a lower degree of contribution possibly interferes with another first active sensor mounted on another robot, the lowering frequency on the output intensity of the first active sensor mounted on the self robot is adjusted higher. Accordingly, each robot can continue to execute the task while avoiding the mutual interference between the first active sensor with a lower degree of contribution to the task and the first active sensor mounted on another robot.

A third aspect of the present invention is dependent on the second aspect of the present invention, wherein the second processing element controls the actions of the robot to displace the position of the object or to guide the object so as to match the directivity of another first active sensor which is not corresponded to the designated active sensor to the orientation of the object when the output intensity of a first active sensor which is corresponded to the designated active sensor and is outputting signals for determining the position or the orientation of the object or for identifying the object is decreased.

According to the robot of the third aspect of the present invention, when the output intensity of the first active sensor contributing to determining the position or the orientation of an object or to identifying the object has to be decreased, the robot can perform actions by displacing the position or the orientation of the object. Accordingly, the object can be moved out of a region where the first active sensor mounted on the self robot may interfere with a first active sensor mounted on another robot. As a result, each robot can be expected to continue a task while continually determining the position or the orientation of the object or continually identifying the object by the other first active sensors.

A fourth aspect of the present invention is dependent on the first aspect of the present invention. The robot of the fourth aspect of the present invention is provided with a second active sensor directed to a detection region for determining a position of an object located in the detection region as the active sensor, and the second processing element evaluates higher the degree of contribution to a task by the second active sensor if the task is recognized being executed by the self robot on the basis of a determination result on the position of the object located in the detection region.

According to the robot of the fourth aspect of the present invention, when the self robot is executing a task according to the determination result on the position of an object located in the detection region by using the second active sensor, the degree of contribution by the second active sensor is evaluated relatively higher. Further, when a second active sensor with a higher degree of contribution mounted on the self robot possibly interferes with another second active sensor mounted on another robot, the lowering frequency on the output intensity of the second active sensor mounted on the self robot is adjusted lower. Accordingly, the robot can continue to execute the task according to the determination result of the position of an object which is obtained on the basis of the output result from the second active sensor with a higher degree of contribution. On the other hand, when the self robot is not executing a task according to the determination result on the position of an object located in the detection region by using the second active sensor, the degree of contribution by the second active sensor is evaluated relatively lower. Further, when a second active sensor with a lower degree of contribution possibly interferes with another second active sensor mounted on another robot, the lowering frequency on the output intensity of the second active sensor is adjusted higher. Accordingly, as aforementioned, each robot can continue to execute the task while avoiding the mutual interference between the second active sensor with a lower degree of contribution to the task and the second active sensor mounted on another robot.

A fifth aspect of the present invention is dependent on the first aspect of the present invention, wherein the second processing element recognizes a priority level of the task being executed by the robot, and evaluates higher the degree of contribution of the active sensor to the task if the priority level is greater.

According to the robot of the fifth aspect of the present invention, the degree of contribution of the active sensor contributing to a task with a higher priority level is evaluated higher. For example, when the active sensors mounted on two different robots, respectively, contribute to a task being executed by each robot, the lowering frequency on the output intensity of the active sensor mounted on the robot executing the task with a higher priority level is decreased. Consequently, when the active sensors possibly interfere with each other, the output intensity of the active sensor mounted on the robot which is executing the task with a higher priority level can be maintained and the robot can be expected to execute the task continually.

A task execution system of a sixth aspect of the present invention is composed of the support server and a plurality of robots of the first aspect.

According to the task execution system of the sixth aspect of the present invention, the mutual interference between plural active sensors mounted on each robot can be avoided so as to make each robot execute a task smoothly.

BRIEF DESCRIPTION OF THE DRAWINGS

FIG. 3 is an explanatory diagram relating to directivity of an active sensor.

FIG. 6 is a table related to an evaluation method for the degree of contribution of each active sensor to each task.

FIG. 7 is a table related to an evaluation result for the degree of contribution of each active sensor to each task.

FIG. 9($a$) and FIG. 9($b$) are diagrams related to an adjusting method on the output intensity of the active sensor (Example 2).

DETAILED DESCRIPTION OF THE PREFERRED EMBODIMENTS

Figure 1:
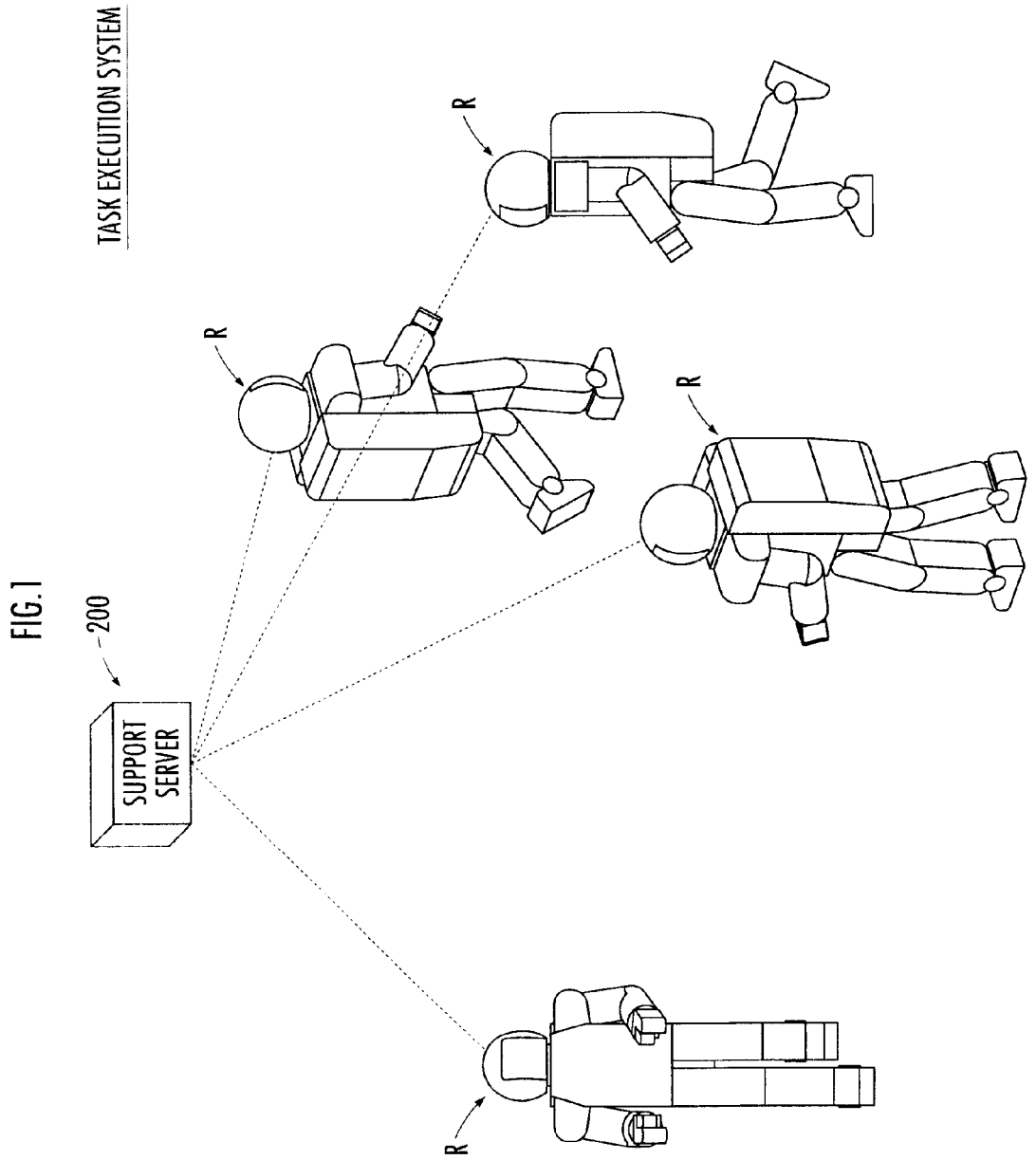
FIG. 1 is a schematic diagram illustrating a task execution system of the present invention.

Hereinafter, embodiments of a robot and a task execution system of the present invention will be described in detail with reference to the drawings. The task execution system illustrated in FIG. 1 is composed of a plurality of robots R and a support server 200.

Figure 2:
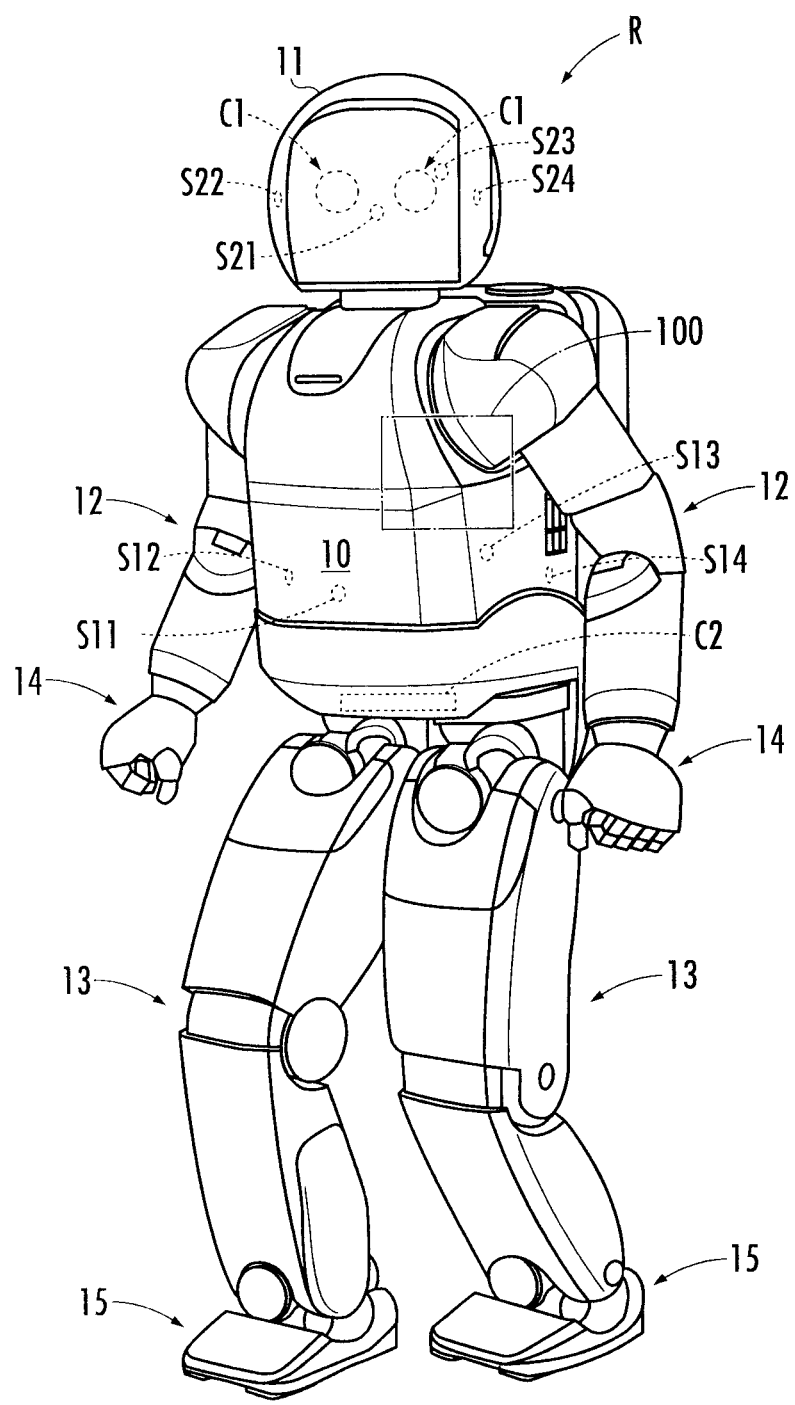
FIG. 2 is a schematic diagram illustrating a robot of the present invention.
Figure 4:
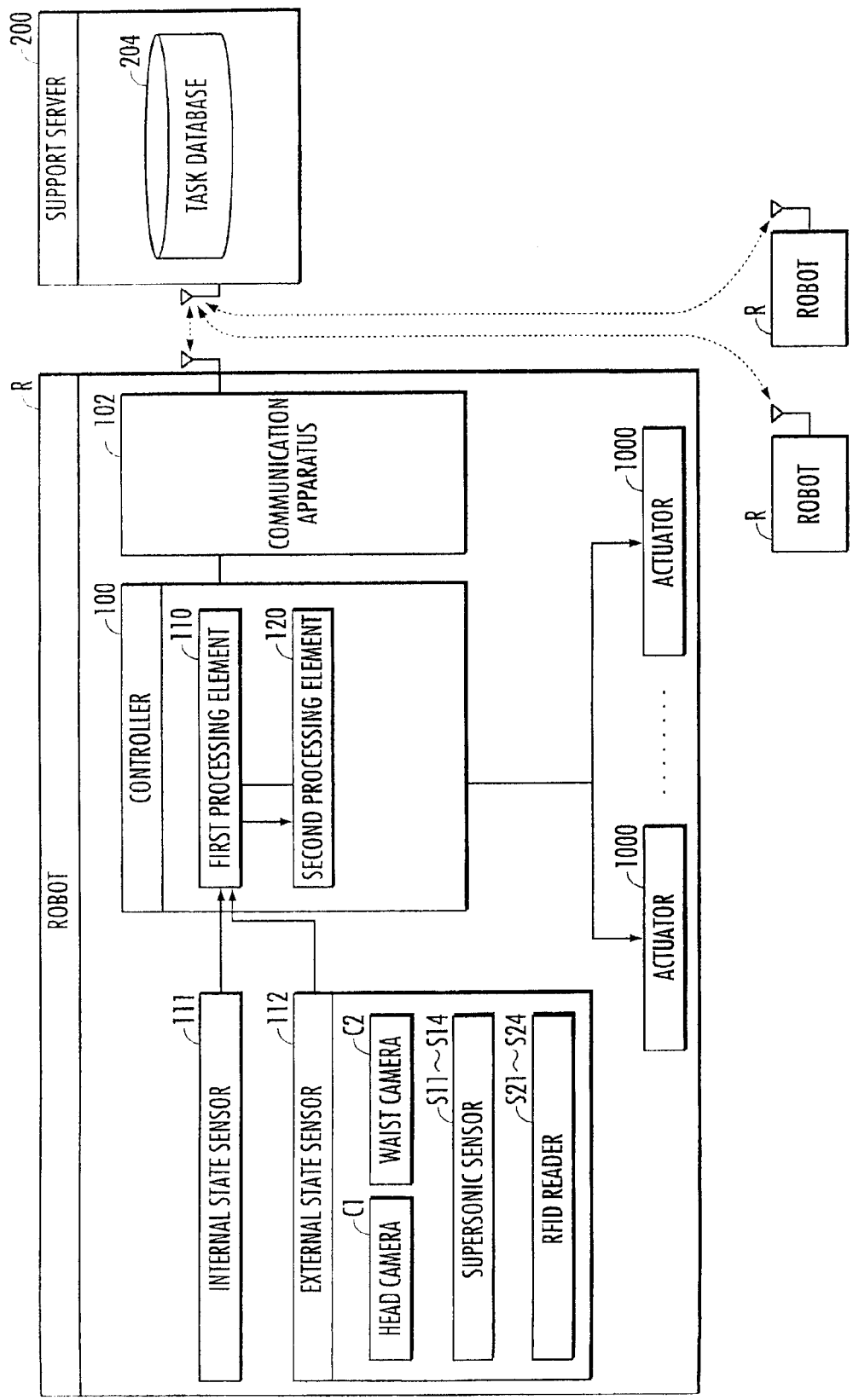
FIG. 4 is a block diagram illustrating a controller of the robot and a support server.

The robot R illustrated in FIG. 2 is provided with a body 10, a head 11 disposed at an upper portion of the body 10, a pair of left and right arms 12 extended from both lateral sides of the upper portion of the body 10, a hand 14 disposed at an end portion of the arm 12, a pair of left and right legs 13 extended downward from a lower portion of the body 10, and a foot 15 attached to an end portion of the leg 13. As disclosed in domestic re-publications of PCT international application 03/090978 and 03/090979, according to a force transmitted from the actuator 1000 (refer to FIG. 2), the robot R can stretch and bend the arm 12 or the leg 13 at a plurality of joints equivalent to a plurality of joints of a human, such as a shoulder joint, an elbow joint, a wrist joint, a hip joint, a knee joint, an ankle joint and so forth. The robot R can autonomously move according to iterated motions of stepping on ground and leaving off ground of the left and right legs 13 (or the feet 15), respectively. The height of the head 11 can be adjusted through adjusting an inclined angle relative to the vertical direction of the body 10. In addition to the robot R which moves autonomously according to the motions of the plurality of legs 13, any device which has a motion function, such as a wheel-type moving robot (automobile), may be used as a motion device.

The head 11 is mounted with a pair of head cameras (CCD camera) $C_1$. The pair of head cameras $C_1$ are laterally disposed and directed to the front of the robot R. The body 10 is mounted with a waist camera (second active sensor) $C_2$ which outputs infrared laser lights (electromagnetic waves) to a detection region A ($C_2$) in a lower portion ahead of the robot R and outputs signals according to the received reflection lights (refer to FIG. 3($a$) to FIG. 3($c$)). The waist camera $C_2$ is configured to determine a position of an object located in the lower portion ahead of the robot R, to determine an orientation or posture of the robot R according to a recognition of a shape and posture of a mark set on the floor surface, and to determine a position or posture of a transporting object according to a recognition result of a shape or posture of a mark attached on the transporting object such as a wagon or the like.

The body 10 is further mounted with supersonic sensors (first active sensor) $S_{11}$~$S_{14}$ which output ultrasonic waves (elastic oscillation wave) to detection regions A($S_{11}$)~A($S_{14}$) expanding respectively to the front side, the right side, the back side and the left side of the robot R, and output signals according to the received reflection waves (refer to FIG. 3($a$) to FIG. 3($c$)). Each of the supersonic sensors $S_{11}$~$S_{14}$ is used to determine a position of an object around the robot R. The head 11 is further mounted with RFID readers (first active sensor) $S_{21}$~$S_{24}$ which output electromagnetic waves to detection regions A($S_{21}$)~A($S_{24}$) expanding respectively to the front side, the right side, the back side and the left side of the robot R, and output signals according to the received reflection waves (refer to FIG. 3($a$) to FIG. 3($c$)). Each of the RFID readers $S_{21}$~$S_{24}$ is used to recognize a human or an object around the robot R according to wireless communication with a RFID tag carried by the human or attached on the object.

Note that it is acceptable to use a region with a spatial expanding different from the detection regions illustrated in FIG. 3($a$) to FIG. 3($c$) as a detection region for the supersonic sensors $S_{11}$~$S_{14}$, the RFID readers $S_{21}$~$S_{24}$ and the waist camera $C_2$, respectively. It is acceptable to appropriately vary the numbers of the supersonic sensors $S_{11}$~$S_{14}$, the RFID readers $S_{21}$~$S_{24}$ and the waist camera $C_2$ according to the spatial expanding of the detection region, the usage or role of the robot R and so forth. In addition to the supersonic sensors $S_{11}$~$S_{14}$, the RFID readers $S_{21}$~$S_{24}$ and the waist camera $C_2$, it is acceptable to mount on the robot R various other active sensors with directivity which output various electromagnetic waves or elastic oscillation waves (supersonic wave, sound wave) and output signals according to the received reflection waves. Each active sensor may be an active sensor set composed of active sensors with different numbers, types, detection regions and the like according to the usage or role of each robot R.

The robot R is provided with a controller 100 and a communication device 102. The controller 100 is comprised of an ECU or a computer (comprising a CPU, a ROM, a RAM, an I/O and the like) as hardware. A control program (software) is stored in a memory of the computer. The control program may be installed in the computer via a software-recording medium such as a CD or a DVD. The control program may also be downloaded from a server via a network or a satellite to the computer every time when there is a request transmitted from the robot R to the server.

The controller 100 illustrated in FIG. 3 controls the motions of the arms 12 and the legs 13 through controlling an actuator 1000 on the basis of output signals from an internal state sensor 111 and an external state sensor 112. The controller 100 controls the actions of the robot R to make it execute a task according to an execution command for executing the task issued from the support server 200 to the robot R. The internal sensor 111 is configured to determine an internal state or a behavior state of the robot R. The internal state sensor 111 may be of various sensors mounted on the robot R, such as a gyro sensor which outputs a signal in relation to an acceleration of the body 10, a rotary encoder which outputs a signal in relation to a joint angle of each joint, a force sensor or the like which outputs a signal in relation to a floor reactant force acted on the legs 13. The external state sensor 112 is configured to determine a behavior state or the like of an object and an external state or an environment of the robot R. The head camera $C_1$, the waist camera $C_2$, the supersonic sensors $S_{11}$~$S_{14}$, the RFID readers $S_{21}$~$S_{24}$ and so forth are equivalent to the external state sensor 112. In addition to a driving source such as an electric motor, the actuator 1000 is composed of a reduction gear disposed between an output shaft of the driving source and a link constituting the arm 12 or the leg 13, and a flexible element such as an elastic member.

The controller 100 includes a first processing element 110 and a second processing element 120.

The first processing element 110 determines a position of the self robot R in the global coordinate system and an orientation of the self robot R in the positive X direction of the robot coordinate system in the global coordinate system (refer to FIG. 3($a$) to FIG. 3($c$)) and transmits the position and the orientation to the support server 200 to store them in a task database 204. The first processing element 110 also recognizes or retrieves a position and an orientation of another robot stored in the task database 204 according to communication with the support server 200. On the basis of the determination result and the recognition result, the first processing element 110 designates from the plural active sensors disposed in the self robot. R an active sensor which has a possibility to interfere with either of the plural active sensors disposed in another robot R.

The second processing element 120 evaluates the degree of contribution of each of the plural active sensors (the supersonic sensors $S_{11}$~$S_{14}$, the RFID readers $S_{21}$~$S_{24}$ and the waist camera $C_2$) to a task being executed by the robot R, and transmits a contribution degree information denoting the degree of contribution to the support server 200 to be stored in the task database 204. The second processing element 120 also recognizes or retrieves from the task database 204 at least the degree of contribution of the active sensor designated by the first processing element 110 from the active sensors disposed in another robot R according to communication with the support server 200. On the basis of the evaluation result and the recognition result, the second processing element 120 compares the degree of contribution of the designated active sensor of the self robot R and the degree of contribution of the designated active sensor of the other robot R. On a condition that the degree of contribution of the designated active sensor of the self robot R is lower than the degree of contribution of the designated active sensor of the other robot R, the second processing element 120 decreases an output intensity of the designated active sensor of the self robot R.

The support server 200 as illustrated in FIG. 3 (composed of a CPU, a ROM, a RAM, an I/O and so forth) can communicate with each of the plural robots R via a base station (not shown) and a communication network. As illustrated in FIG. 1, the support server 200 may be composed of a computer independent from each robot R, or may be composed of one computer mounted on one robot or plural computers mounted on plural robots. The task database 204 is included in the support server 200. The determination result of the position and the orientation by each robot R, the evaluation result of the degree of contribution of each active sensor to the task of each active sensor disposed in each robot R are stored or memorized in the task database 204.

Various functions of the task execution system with the aforementioned configuration will be described hereinafter. Information of a task and an execution command of the task are transmitted from the support server 200 to each robot R. The controller 100 disposed in each robot R controls the actions of the robot R to execute the task by controlling the actuator 1000 on the basis of the task execution command and the output signals or the like from the internal state sensor 111 and the external state sensor 112.

Figure 5:
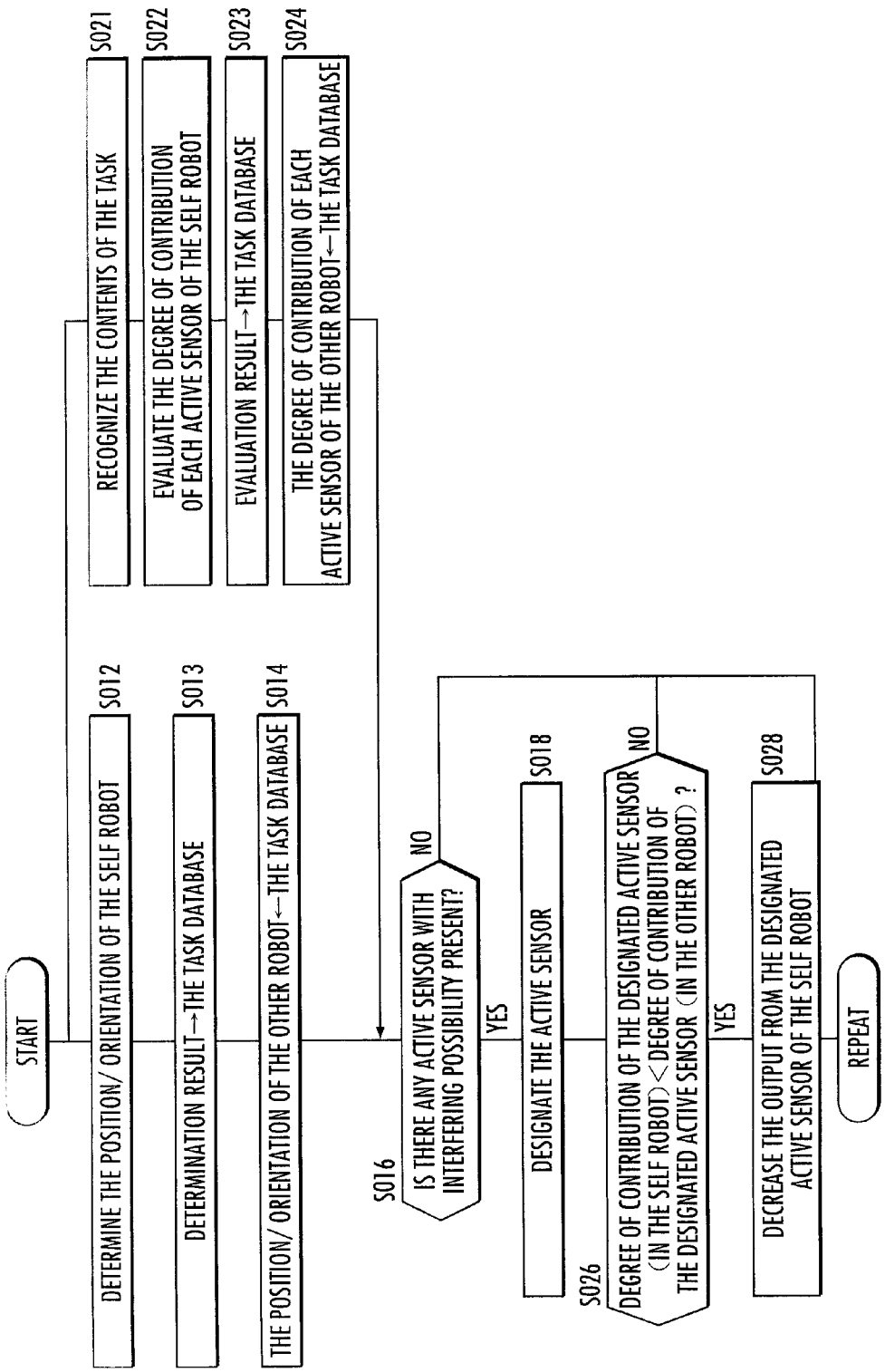
FIG. 5 is a flow chart illustrating functions of the robot of the present invention.

Under this situation, the first processing element 110 determines the position and the orientation of the robot R in the global coordinate system (FIG. 5/S012). The position of the robot R in the global coordinate system ((latitude, longitude) or (latitude, longitude, altitude)) is determined according to GPS signals received from a satellite by a GPS receiver (not shown) serving as the internal state sensor 111 or output signals from a gyro sensor or an acceleration sensor serving as the internal state sensor 111. The orientation of the robot R in the global coordinate system (for example, a unit vector denoting the positive X direction in the robot coordinate system) is determined according to a recognition result of an arrangement or shape of a floor mark by the waist camera $C_2$ serving as the internal state sensor 111, or output signals denoting an accumulated rotation angle around a yaw axis from a gyro sensor. The determination result of the position and the orientation is transmitted from the robot R to the support server 200 to be stored in the task database 204 (FIG. 5/S013). Moreover, the position and orientation of another robot are recognized or retrieved from the task database 204 according to the communication with the support server 200 (FIG. 5/S014).

Thereafter, on the basis of the determination result and the recognition result, whether an active sensor which has a possibility to interfering with either of the plurality of active sensors disposed in another robot R is present or not in the plurality of active sensors disposed in the self robot R is determined (FIG. 5/S016).

Figure 8:
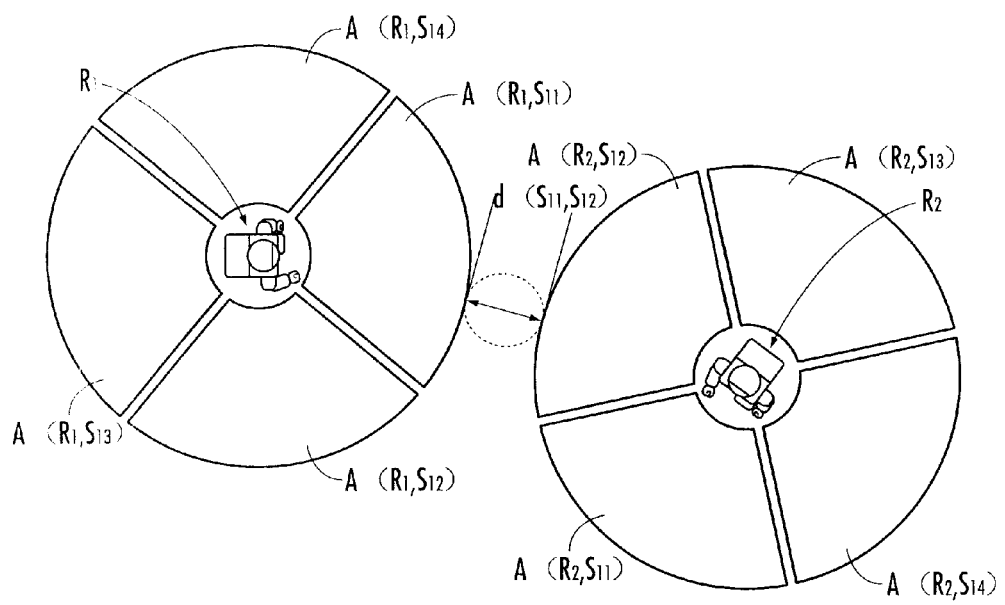
FIG. 8($a$) and FIG. 8($b$) are diagrams related to an adjusting method on the output intensity of the active sensor (Example 1).
Figure 8:
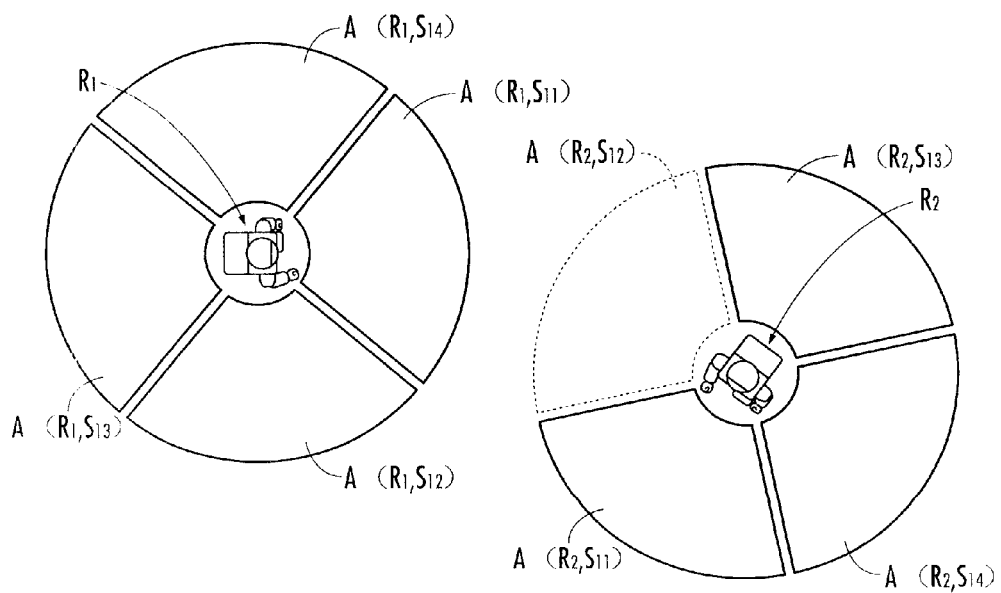

For example, as illustrated in FIG. 8(a), the diameter $d(S_{1h1}, S_{1h2})$ of the minimum circle tangent to both a detection region A ($R_1$, $S_{1h1}$) of a supersonic sensor $S_{1h1}$ (h1=1~4) mounted on a first robot (the self robot) $R_1$ and the other detection region A ($R_2$, $S_{1h2}$) of a supersonic sensor $S_{1h2}$ (h2=1~4) mounted on a second robot (the other robot) $R_2$ is determined as an interval $d(S_{1h1}, S_{1h2})$ therebetween. As shown in the equation (1), when the determined interval $d(S_{1h1}, S_{1h2})$ is equal to or smaller than a first threshold $d_1$, it is determined that there is a possibility of mutual interference between the supersonic sensor $S_{1h1}$ mounted on the first robot $R_1$ and the supersonic sensor $S_{1h2}$ mounted on the second robot $R_2$.

$$d(S_{1h1}, S_{1h2}) \leq d_1 \tag{1}$$

As illustrated in FIG. 9(a), the diameter $d(S_{2h1}, S_{2h2})$ of the minimum circle tangent to both a detection region A ($R_1$, $S_{2h1}$) of a RFID reader $S_{2h1}$ (h1=1~4) mounted on the first robot $R_1$ and another detection region A ($R_2$, $S_{2h2}$) of a RFID reader $S_{2h2}$ (h2=1~4) mounted on the second robot $R_2$ is determined as an interval $d(S_{2h1}, S_{2h2})$ therebetween. As shown in the equation (2), when the determined interval d ($S_{2h1}, S_{2h2}$) is equal to or smaller than a second threshold $d_2$, it is determined that there is a possibility of mutual interference between the RFID reader $S_{2h1}$ mounted on the first robot $R_1$ and the RFID reader $S_{2h2}$ mounted on the second robot $R_2$.

$$d(S_{2h1}, S_{2h2}) \leq d_2 \tag{2}$$

Figure 10:
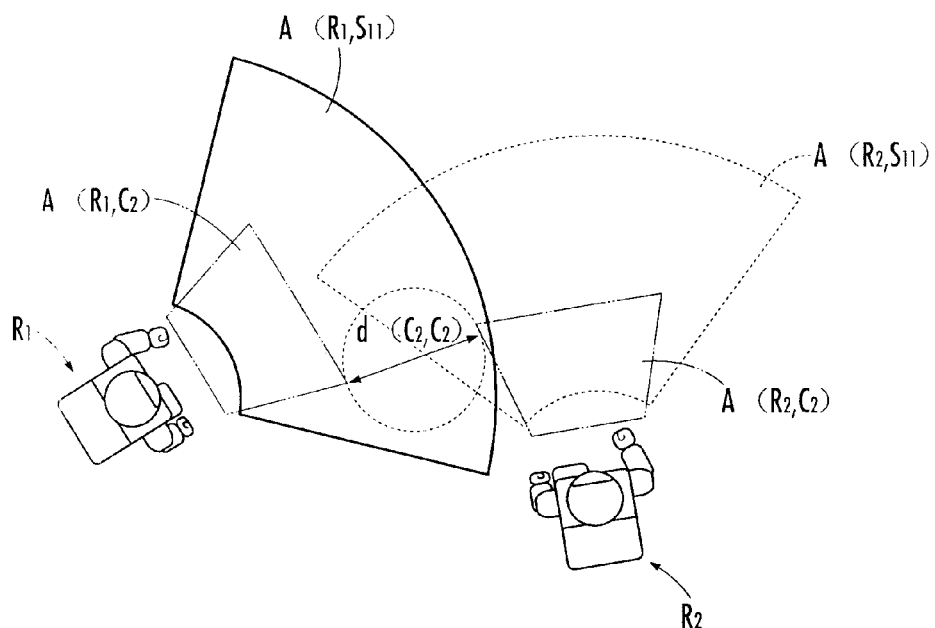
FIG. 10($a$) and FIG. 10($b$) are diagrams related to an adjusting method on the output intensity of the active sensor (Example 3).
Figure 10:
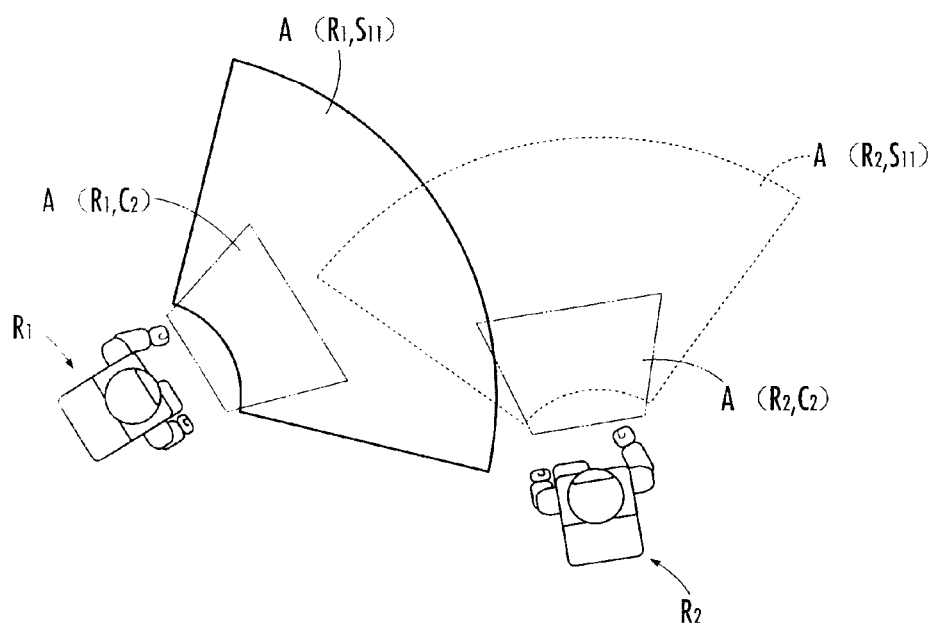

As illustrated in FIG. 10(a), the diameter $d(C_{21}, C_{22})$ of the minimum circle tangent to both a detection region A ($R_1, C_2$) of a waist camera $C_2$ mounted on the first robot $R_1$ and another detection region A ($R_2, C_2$) of a waist camera $C_2$ mounted on the second robot $R_2$ is determined as an interval $d(C_2, C_2)$ therebetween. As shown in the equation (3), when the determined interval $d(C_2, C_2)$ is equal to or smaller than a second threshold $d_3$, it is determined that there is a possibility of mutual interference between the waist camera $C_2$ mounted on the first robot $R_1$ and the waist camera $C_2$ mounted on the second robot $R_2$.

$$d(C_2, C_2) \leq d_3 \tag{3}$$

The second processing element 120 transmits the contents of the task being executed by the self robot R from the task database 204 to the self robot R and recognizes it according to the task information stored in the storing device (FIG. 5/S021). Thereafter, the degree of contribution a of each active sensor to the task is evaluated (FIG. 5/S022). For example as illustrated in FIG. 6, the degrees of contribution $\alpha_{i1} \sim \alpha_{i9}$ of the supersonic sensors $S_{11} \sim S_{14}$, the RFID readers $S_{21} \sim S_{24}$ and the waist camera $C_2$ mounted on each robot R with respect to each task $tsk_i$ (i=1~m), respectively, are calculated or evaluated according to a table or an algorithm preliminarily stored in memory. The task $tsk_i$ is specified according to the contents thereof, such as the type (pushing a wagon to move it, holding a tray for transporting it, walking, guiding an individual to reach a destination while recognizing the individual and so forth), the priority level thereof and the like. Thereafter, the evaluation result on the degree of contribution $\alpha$ (= $\alpha_{i1}, \ldots, \alpha_{i9}$) of each active sensor to each task is transmitted to the support server 200 to be stored in the task database 204 (FIG. 5/S023). When the robot R is not executing a task, the degree of contribution $\alpha$ is evaluated as "0", in other words, the degree of contribution $\alpha$ will not be evaluated. Thereby, the degree of contribution $\beta$ (= $\beta_{k1}, \ldots, \beta_{k9}$) of each active sensor mounted on each robot $R_k$ (k=1~n) to each task is stored in the task database 204. When a robot $R_k$ is executing a task (content: $tsk_i$), $\beta_{ks} = \alpha_{is}$ (s=1~9).

Subsequently, the degree of contribution of an active sensor designated by the first processing element 110 in the active sensors disposed in another robot R is recognized or retrieved in the task database 204 according to communication with the support server 200 (FIG. 5/ S024). It is acceptable to recognize or retrieve the degree of contribution of an arbitrary active sensor other than the designated active sensor in the active sensors disposed in the other robot R. Thereafter, on the basis of the evaluation result and the recognition result, whether or not the degree of contribution of the designated active sensor disposed in the self robot R is lower than the degree of contribution of the designated active sensor disposed in the other robot R is determined (FIG. 5/5026). If it is determined that the degree of contribution of the designated active sensor disposed in the self robot R is lower than the degree of contribution of the designated active sensor disposed in the other robot R (FIG. 5/S026 . . . YES), the output intensity of the designated active sensor disposed in the self robot R is decreased (FIG. 5/S028).

According to the robot R exhibiting the aforementioned functions, when either of the plurality of active sensors mounted on the self robot R has a possibility to interfere with either of the plurality of active sensors mounted on another robot R, the output intensity of each active sensor is adjusted according to the degree of contribution of each active sensor to the task being executed by each robot R.

For example, as illustrated in FIG. 8(a), when there is a possible mutual interference between the supersonic sensor $S_{11}$ disposed at the front side of the first robot $R_1$ and the supersonic sensor $S_{12}$ disposed at the right side of the second robot $R_2$ and the degree of contribution $\alpha_{j2}$ to a task by the supersonic sensor $S_{12}$ disposed at the right side of the second robot $R_2$ is determined to be lower than the degree of contribution $\alpha_{i1}$ to the task by the supersonic sensor $S_{11}$ disposed at the front side of the first robot $R_1$, the output intensity of the supersonic sensor $S_{12}$ disposed at the right side of the second robot $R_2$ is decreased (refer to FIGS. 5/S016, S018, S026 and S028). This is due to the reason that both the first robot $R_1$ and the second $R_2$ are executing the task involving forward motions, the degree of contribution $\alpha_{i1}$ to the task by the supersonic sensor $S_{11}$ disposed at the front side of each robot for determining the position of an object located in the front side is evaluated to be higher than the degrees of contribution $\alpha_{i2} \sim \alpha_{i4}$ of the other supersonic sensors $S_{12} \sim S_{14}$ to the task, respectively. Therefore, the output intensity of supersonic waves from the supersonic sensor $S_{12}$ disposed at the right side of the second robot $R_2$ to the detection region A ($R_2$, $S_{12}$) enclosed by dashed lines in FIG. 8(b) or the output intensity of the right supersonic sensor $S_{12}$ with respect to the reflection waves from the detection region A ($R_2$, $S_{12}$) is decreased.

Further, as illustrated in FIG. 9(a), when there is a possible mutual interference between the reader $S_{24}$ disposed at the left side of the first robot $R_1$ and the reader $S_{21}$ disposed at the front side of the second robot $R_2$ and the degree of contribution $\alpha_{j5}$ to a task by the reader $S_{21}$ disposed at the front side of the second robot $R_2$ is determined to be lower than the degree of contribution $\alpha_{i8}$ to the task by the reader $S_{24}$ disposed at the left side of the first robot $R_1$, the output intensity of the reader $S_{21}$ disposed at the front side of the second robot $R_2$ is decreased. This is due to the reason that it is necessary for the first robot $R_1$ to recognize an object (drawn in dashed lines) around it, such as a human or the like, according to wireless communication with a RFID tag disposed in the object so as to execute a task, the degree of contribution $\alpha_{i5} \sim \alpha_{i8}$ by each of the readers $S_{21} \sim S_{24}$ contributing to the task of the first robot $R_1$, particularly the degree of contribution $\alpha_{i8}$ of the left reader $S_{24}$ to the task at the present time is evaluated higher.

On the other hand, since the second robot $R_2$ is executing a task without the need to recognize such object, the degrees of contribution $\alpha_{i5} \sim \alpha_{i8}$ of each of the readers thereof having no contribution to the task is evaluated lower. Therefore, the output intensity of electromagnetic waves from the reader $S_{21}$ disposed at the front side of the second robot $R_2$ to the detection region A ($R_2$, $S_{21}$) enclosed by dashed lines in FIG. 9(b) or the output intensity of the front reader $S_{21}$ with respect to the reflection waves from the detection region A ($R_2$, $S_{21}$) is decreased.

Furthermore, as illustrated in FIG. 10(a), when there is a possible mutual interference between the waist camera $C_2$ disposed in the first robot $R_1$ and the waist camera $C_2$ disposed in the second robot $R_2$ and the degree of contribution $\alpha_{i9}$ to a task by the waist camera $C_2$ disposed in the first robot $R_1$ to the task is determined to be lower than the degree of contribution $\alpha_{j9}$ to the task by the waist camera $C_2$ disposed in the second robot $R_2$ to the task, the output intensity of the waist camera $C_2$ disposed in the first robot $R_1$ is decreased. This is due to the reason that both the first robot $R_1$ and the second robot $R_2$ are executing a task involving forward motions and the output intensity of the front supersonic sensor $S_{11}$ in the second robot $R_2$ is decreased, the degree of contribution $\alpha_{j9}$ to the task by the waist camera $C_2$ for determining the position of an object in the front side is evaluated higher than the degree of contribution $\alpha_{i9}$ to the task by the waist camera $C_2$ disposed in the first robot $R_1$ with a high output intensity from the front supersonic sensor $S_{11}$. Accordingly, the output intensity of infrared laser lights output to the detection region A ($R_1$, $C_2$) as drawn in dashed line in FIG. 10(b) of the waist camera $C_2$ disposed in the first robot $R_1$ can be decreased.

As aforementioned, the lowering frequency of the output intensity of the active sensor with a higher degree of contribution to a task is adjusted to be relatively lower, while the lowering frequency of the output intensity of the active sensor with a lower degree of contribution to the task is adjusted to be relatively higher. Thereby, the mutual interference in the plurality of active sensors (the supersonic sensors $S_{11} \sim S_{14}$, the RFID readers $S_{21} \sim S_{24}$ and the waist camera $C_2$) mounted on each robot R can be avoided so as to prove each of the plurality of robots R executing the task smoothly.

When one robot R such as the first robot $R_1$ is executing a task on the basis of the determination result of the position or orientation of an object performed by the front supersonic sensor $S_{11}$ of the plurality of supersonic sensors (the first active sensor) $S_{11} \sim S_{14}$, the degree of contribution $\alpha_{i1}$ of the front supersonic sensor $S_{11}$ is evaluated relatively higher (refer to FIG. 6 and FIG. 8(a)). When the front supersonic sensor $S_{11}$ with a higher degree of contribution has a possibility to interfere with either sensor (for example, the right supersonic sensor $S_{12}$) of supersonic sensors $S_{11} \sim S_{14}$ mounted on another robot R such as the second robot $R_2$ or the like, the lowering frequency of the output intensity of the front supersonic sensor $S_{11}$ in the robot R is decreased (refer to FIG. 8(b)). Thereby, the robot R can execute the task continually according to the determination result of the position or orientation of an object or the recognition result of the object based on the output result from the front supersonic sensor $S_{11}$ with a higher degree of contribution. On the other hand, the degrees of contribution $\alpha_{i2} \sim \alpha_{i4}$ of the other supersonic sensors $S_{12} \sim S_{14}$ are evaluated relatively lower (refer to FIG. 6). Thus, when the supersonic sensors $S_{12} \sim S_{14}$ with a lower degree of contribution mounted on one robot R possibly interfere with the supersonic sensors $S_{11} \sim S_{14}$ mounted on another robot R, the lowering frequency on the output intensity of the supersonic sensors mounted on the one robot R is adjusted higher. Accordingly, the robot R can continue to execute the task while avoiding the mutual interference between the supersonic sensors $S_{12}$~$S_{14}$ with a lower degree of contribution to the task and the supersonic sensors $S_{11}$~$S_{14}$ mounted on another robot R. The same holds true for the RFID readers $S_{21}$~$S_{24}$.

Further, when one robot R such as the first robot $R_1$ or the like is executing a task according to the determination result of the position of an object in the detection region $A(C_2)$ (refer to FIG. 3(a) to FIG. 3(c)) by the waist camera (the second active sensor) $C_2$, the degree of contribution $\alpha_{i9}$ to the task by the waist camera $C_2$ is evaluated relatively higher (refer to FIG. 6 and FIG. 10(a). Thus, when the waist camera $C_2$ with a higher degree of contribution $\alpha_{i9}$ has a possibility to interfere with the waist camera $C_2$ mounted on another robot R such as the second robot $R_2$ or the like, the lowering frequency of the output intensity of the waist camera $C_2$ mounted on the one robot R is decreased (refer to FIG. 10(b)). Thereby, the robot R can continue to execute the task according to the determination result of the position of the object which is obtained on the basis of the output result from the waist camera $C_2$ with a higher degree of contribution $\alpha_{i9}$. On the other hand, when the robot R is not executing a task on the basis of the determination result of the position or orientation of an object by the waist camera $C_2$, the degree of contribution $\alpha_{i9}$ of the waist camera $C_2$ is evaluated relatively lower. Thus, when the waist camera $C_2$ with a lower degree of contribution $\alpha_{i9}$ possibly interferes with the waist camera $C_2$ mounted on another robot R such as the second robot $R_2$ or the like, the lowering frequency of the output intensity of the waist camera $C_2$ mounted on the one robot R is adjusted higher. Accordingly, the one robot R can continue to execute the task while avoiding the mutual interference between the waist camera $C_2$ with a lower degree of contribution to the task and the waist camera $C_2$ mounted on another robot R.

The degree of contribution a of an active sensor to a task with a higher priority level is evaluated higher. For example, when the active sensors mounted on two different robots R, respectively, contribute to a task being executed by the individual robot R, the lowering frequency of the output intensity of the active sensor mounted on the robot R which is executing the task with a higher priority level is decreased. Thereby, when each active sensor possibly interferes with each other, it is expected that the output intensity of the active sensor mounted on a robot R which is executing the task with a higher priority level can be maintained and the robot R can continue to execute the task.

It is acceptable for the second processing element 120 to control the actions of the robot R to displace the position of an object or to guide the object on a condition that a command for lowering the output intensity of the supersonic sensor $S_{11}$~$S_{14}$ or the RFID readers $S_{21}$~$S_{24}$ serving as the designated active sensors is transmitted from the support server 200 to the robot R so as to match the directivity of the supersonic sensor $S_{11}$~$S_{14}$ or the RFID readers $S_{21}$~$S_{24}$ which are not designated as the active sensors to the orientation of the object. In this situation, if the output intensity from either of the supersonic sensor $S_{11}$~$S_{14}$ contributing to the determination of the position or orientation of an object or either of the RFID readers $S_{21}$~$S_{24}$ contributing to the identification of an object has to be lowered, the robot R can act by displacing the position or orientation of the object.

For example, as illustrated in FIG. 8(a), despite that the first robot $R_1$ is executing a task while recognizing a human in the front by using the front supersonic sensor $S_{11}$, the output intensity thereof has to be lowered, the first robot $R_1$ moves the arm 12 or outputs a sound voice from a speaker (not shown) so as to guide the human to the right side of the first robot $R_1$. Thereby, the object can be moved out of the region where there is an interfering possibility between the supersonic sensors (the first active sensors) $S_{11}$~$S_{14}$. Thus, it is expected that the robot R can continue the task while determining continually the position or orientation of the object by using the other supersonic sensors such as the left supersonic sensor $S_{14}$ and the like among the supersonic sensors $S_{11}$~$S_{14}$.

As illustrated in FIG. 9(a), despite that the first robot $R_1$ is executing a task while recognizing a human in the left side by using the left reader $S_{24}$, the output intensity thereof has to be lowered, the first robot $R_1$ moves the arm 12 or outputs a sound voice from a speaker (not shown) so as to guide the human to the right side of the first robot $R_1$. When an object such as a package or the like attached with a RFID tag serves as the identification subject, it is acceptable for the robot R to move the left and right arms 12 and hands 13 so as to move the object to the right side or the left side thereof while recognizing the position, shape and size of the object through the head camera $C_1$ or the waist camera $C_2$. Thereby, the object can be moved out of a region where there is an interfering possibility between the RFID readers (the first active sensors) $S_{21}$~$S_{24}$. Thus, it is expected that the task can be continued while continually identifying the object by using the other readers such as the right RFID reader $S_{22}$ and the like among the RFID readers $S_{21}$~$S_{24}$.

In the aforementioned embodiment, whether there is an active sensor in the plurality of active sensors mounted on the self robot R which has a possibility to interfere with either of the plurality of active sensors mounted on another robot R is determined by each robot R (refer to FIG. 5/S016); however, as another embodiment, it is acceptable that the support server 200 performs the determination and transmits the determination result from the support server 200 to the plurality of robots R to make each robot R recognize the designated active sensor.

In the aforementioned embodiment, the degree of contribution to a task by each active sensor mounted on the self robot R is compared with the degree of contribution to the task by each active sensor mounted on another robot R by each robot R (refer to FIG. 5/S026); however, as another embodiment, it is acceptable that the support server 200 performs the comparison and transmits the comparison result from the support server 200 to the plurality of robots R to make each robot R recognize whether or not it is necessary to decrease the output intensity of the designated active sensor.

What is claimed is:

1. A robot which executes a task by making autonomous actions on the basis of communication with a support server provided with a task database, comprising:
   a plurality of active sensors with directivity configured to output: at least one of electromagnetic waves and ultrasonic waves; and output signals related to an external state of the robot according to received reflection waves of the at least one of the electromagnetic waves and ultrasonic waves; and
   a controller configured to control actions of the robot on the basis of the output signals from the plurality of active sensors;
   wherein the controller is provided with a first processing element and a second processing element,
   the first processing element is configured to determine a position and an orientation of the robot,
   store the position and the orientation in the task database on the basis of communication with the support server,
   recognize a position and an orientation of an associated other robot in the task database on the basis of communication with the support server, the associated other robot comprising a plurality of other active sensors with directivity configured to output at least one of electromagnetic waves and ultrasonic waves, and output signals related to an external state of the associated other robot according to received reflection waves of at least one of the electromagnetic waves and ultrasonic waves, and designate in the plurality of active sensors disposed in the robot an active sensor which has a possibility to interfere with any of the plurality of other active sensors disposed in the associated other robot on the basis of the determination result and the recognition result, and designate in the plurality of other active sensors disposed in the associated other robot an other active sensor of the associated other robot with which the designated active sensor of the robot has the possibility to interfere, and the second processing element is configured to evaluate a degree of contribution of each of the plurality of active sensors to a task being executed by the robot, the degree of contribution evaluated based on a predetermined relationship between each of the plurality of active sensors and the task being executed by the robot, store the degree of contribution in the task database on the basis of communication with the support server, recognize at least a degree of contribution of the other active sensor of the associated other robot designated by the first processing element in the task database on the basis of communication with the support server, compare the degree of contribution of the designated active sensor of the robot with the degree of contribution of the designated other active sensor of the associated other robot on the basis of the determination result and the recognition result, and decrease an output intensity of the designated active sensor of the robot on a condition that the degree of contribution of the designated active sensor of the robot is lower than the degree of contribution of the designated other active sensor of the associated other robot.

2. The robot according to claim 1, wherein the robot is provided with a plurality of first active sensors directed to a plurality of directions for determining a position or an orientation of an object or for identifying the object as the active sensors, and the second processing element evaluates higher the degree of contribution to a task by a first active sensor which contributes to determining the position or the orientation of the object or identifying the object in the plurality of the first active sensors if the task is recognized being executed by the robot on the basis of a determination result of the position or the orientation of the object or an identification result of the object.

3. The robot according to claim 2, wherein the second processing element controls the actions of the robot to displace the position of the object or to guide the object so as to match the directivity of another first active sensor which is not corresponded to the designated active sensor to the orientation of the object when the output intensity of a first active sensor which is corresponded to the designated active sensor and is outputting signals for determining the position or the orientation of the object or for identifying the object is decreased.

4. The robot according to claim 1, wherein the robot is provided with a second active sensor directed to a detection region for determining a position of an object located in the detection region as the active sensor, and the second processing element evaluates higher the degree of contribution to a task by the second active sensor if the task is recognized being executed by the robot on the basis of a determination result on the position of the object located in the detection region.

5. The robot according to claim 1, wherein the second processing element recognizes a priority level of the task being executed by the robot, and evaluates higher the degree of contribution of the active sensor to the task if the priority level is greater.

6. A task execution system comprising:

a support server provided with a task database; and a plurality of robots, each of the plurality of robots comprising:

a plurality of active sensors with directivity configured to output: at least one of electromagnetic waves and ultrasonic waves; and output signals related to an external state of the robot according to received reflection waves of the at least one of the electromagnetic waves and ultrasonic waves; and a controller configured to control actions of the robot on the basis of the output signals from the plurality of active sensors;

wherein the controller is provided with a first processing element and a second processing element, the first processing element is configured to determine a position and an orientation of the robot, store the position and the orientation in the task database on the basis of communication with the support server, recognize a position and an orientation of another robot from among the plurality of robots in the task database on the basis of communication with the support server, and designate in the plurality of active sensors disposed in the robot an active sensor which has a possibility to interfere with any of the plurality of active sensors disposed in the other robot on the basis of the determination result and the recognition result, and designate in the plurality of active sensors disposed in the other robot an active sensor with which the designated active sensor of the robot has the possibility to interfere, and the second processing element is configured to evaluate a degree of contribution of each of the plurality of active sensors disposed in the robot to a task being executed by the robot, the degree of contribution evaluated based on a predetermined relationship between each of the plurality of active sensors and the task being executed by the robot, store the degree of contribution in the task database on the basis of communication with the support server, recognize at least a degree of contribution of the active sensor of the other robot designated by the first processing element in the task database on the basis of communication with the support server, compare the degree of contribution of the designated active sensor of the robot with the degree of contribution of the designated active sensor of the other robot on the basis of the determination result and the recognition result, and decrease an output intensity of the designated active sensor of the robot on a condition that the degree of contribution of the designated active sensor of the robot is lower than the degree of contribution of the designated active sensor of the other robot.

7. The robot according to claim 1, wherein the associated other robot is substantially identical to the robot.

8. The robot according to claim 1, wherein the degree of contribution of each of the plurality of active sensors to each of a plurality of tasks is stored in a data table, and the degree of contribution of each of the plurality evaluated with reference to the data table.

* * * * *